(12) United States Patent
Dougherty et al.

(10) Patent No.: US 8,880,602 B2
(45) Date of Patent: Nov. 4, 2014

(54) EMBEDDING AN AUTOGRAPH IN AN ELECTRONIC BOOK

(75) Inventors: Casey Maureen Dougherty, San Francisco, CA (US); Melissa Breglio Hajj, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 13/429,238

(22) Filed: Mar. 23, 2012

(65) Prior Publication Data

US 2013/0254284 A1    Sep. 26, 2013

(51) Int. Cl.
*G06F 15/16* (2006.01)
(52) U.S. Cl.
USPC ............ 709/204; 709/201; 709/202; 709/203
(58) Field of Classification Search
USPC .................................. 709/201, 202, 203, 204
See application file for complete search history.

(56) References Cited

U.S. PATENT DOCUMENTS

| 2010/0284033 | A1* | 11/2010 | Popovic et al. ............... | 358/1.15 |
| 2011/0157098 | A1 | 6/2011 | Liu | |
| 2011/0294473 | A1* | 12/2011 | Subburam ................... | 455/414.1 |
| 2013/0117665 | A1* | 5/2013 | Tagliaferri et al. ........... | 715/255 |
| 2013/0132230 | A1* | 5/2013 | Gibson et al. ................. | 705/26.8 |

FOREIGN PATENT DOCUMENTS

| WO | 2011/151678 A1 | 12/2011 |
| WO | 2012/012894 A1 | 2/2012 |
| WO | 2012/016032 | 2/2012 |
| WO | 2012/100147 | 7/2012 |

OTHER PUBLICATIONS

"Autography," Autography LLC, St. Petersburg, FL, retrieved on Feb. 15, 2012 from http://www.autography.com/index.php/key_features.
Peter Pachal, "Nook Color to Let Authors Autograph E-Books," PCMag.com, Apr. 26, 2011, retrieved on Feb. 15, 2012 from http://www.pcmag.com/article2/0,2817,2384309,00.asp.
Dougherty, Casey M. et al., "Embedding an Autograph in an Electronic Book",Examiners Report, dated Mar. 11, 2014, Application No. 2805768, Filed Feb. 13, 2013, 4 pages.
Dougherty, Casey M. et al., "Embedding an Autograph in an Electronic Book", Examiners First Report dated Feb. 18, 2014, Application No. 2013200846, filed Feb. 13, 2013, 5 pages.

* cited by examiner

*Primary Examiner* — Liangche A Wang
*Assistant Examiner* — Cheikh Ndiaye
(74) *Attorney, Agent, or Firm* — Novak Druce Connolly Bove + Quigg LLP

(57) ABSTRACT

Disclosed herein are systems, methods, and non-transitory computer-readable storage media for embedding an autograph into digital media, particularly an electronic book. A system is described that includes an author's device running a signing application and at least one reader's device storing a copy of the electronic book. Depending on the proximity of the reader's device to the author's device, the author's device automatically performs different autographing tasks.

19 Claims, 10 Drawing Sheets

EMBEDDING AN AUTOGRAPH IN AN ELECTRONIC BOOK

BACKGROUND

1. Technical Field

The present disclosure relates generally to autographing and more specifically to techniques and systems for embedding autographs in electronic books.

2. Introduction

With the growth in the sheer number of computers and tablet PCs, electronic versions of paper media products such as books, magazines, and newspapers are now commonly available. These electronic versions can be enjoyed on electronic devices such as computers, laptops, tablet PCs, and mobile phones through electronic book reader applications. The electronic versions have some advantages over paper media products such as containing additional content, are user interactive, are cheaper to purchase, and are more convenient to carry around. However, some users still prefer paper media products for the physical attributes of paper media products, which include the ability to have a copy of a book personalized. For example, a user can go to a book signing and get his copy of the book autographed by the author. The autographed copy can hold some special meaning to the reader.

Thus, there is a need for improved techniques for embedding autographs in electronic books.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for embedding an autograph into digital media. The digital media includes electronic books (eBooks) stored on a reader's device, which can be a handheld portable electronic device such as a tablet PC. The reader can bring his copy of the eBook on his portable device to a book signing to have the author embed an autograph into the eBook.

The methods described herein can be incorporated into a book signing application that can be downloaded by an author from an online store. The book signing application is configured to automatically perform one or more autographing tasks based on the proximity of a reader's device to the author or the author's device. In some examples, the autographing task that is performed may be dependent on the proximity of the reader's device to the author's device. Exemplary autographing tasks include generation of an autograph page or autograph hot spot, creation of an autograph, and authenticating an autograph.

Authentication of the autograph can take on many forms. Authentication can be through the content in the autograph (e.g. a photo of the author and the reader) or through authentication certificates. In other examples, authentication can be avoided by managing all autographs on the author's device and an online store, thereby preventing readers from altering or modifying an autograph once it has been created by the author.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
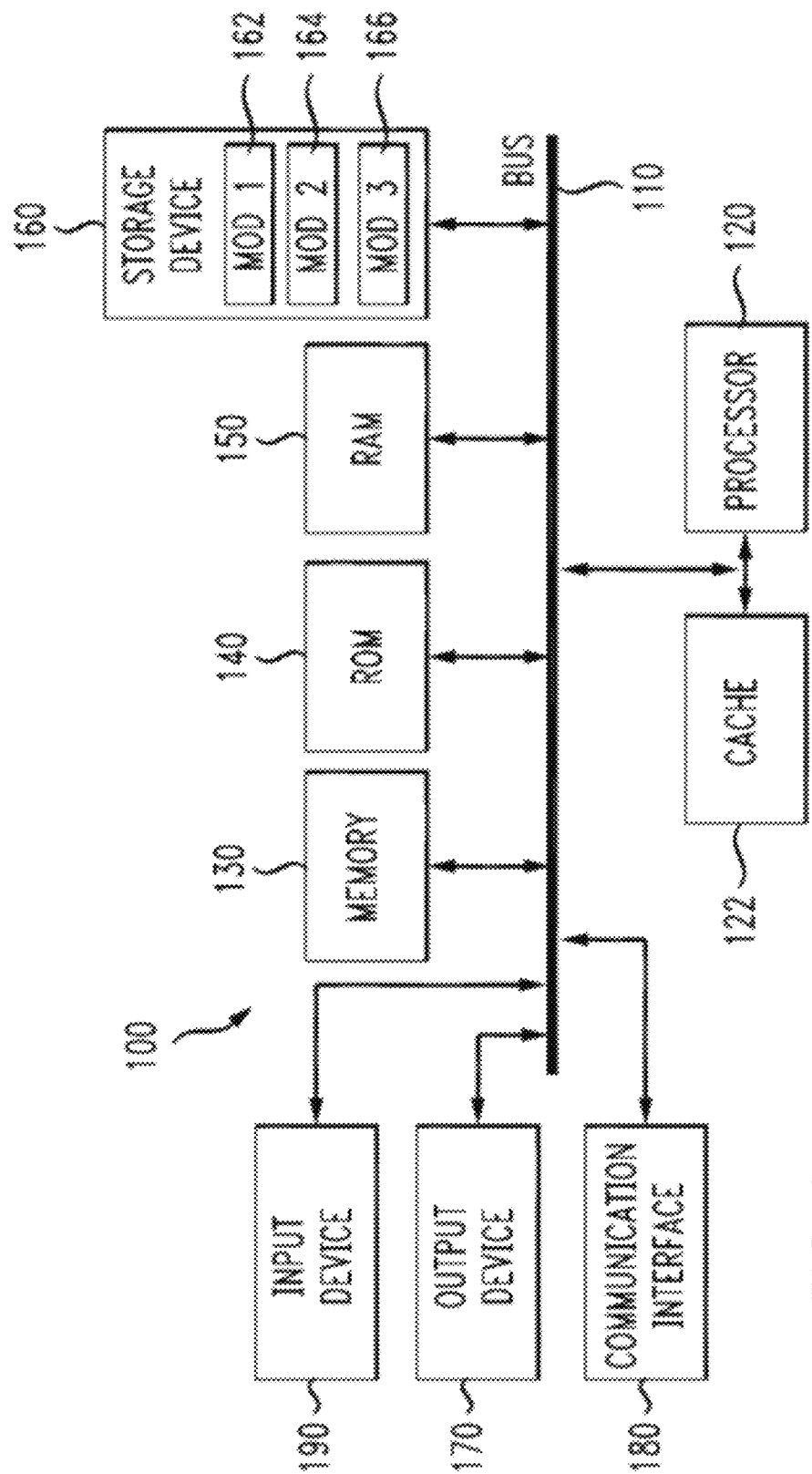
FIG. 1 illustrates an exemplary system embodiment.

The present disclosure addresses the need in the art for systems, techniques, and methods for embedding an autograph into an electronic book (eBook). The autograph is not limited to a signature, but can also include text, audio clips, images, photo albums, videos, or other media items that can be received by a user through senses such as sight, sound, touch, and taste. In other words, the autograph can be any digital data that attaches to the eBook for personalization. Techniques are also described to determine whether an autograph page exists in the eBook and if it doesn't exist, to automatically create one. Autographs can be embedded in both a secure and unsecure manner. These various options provide an author multiple possibilities to personalize an eBook. It is to be understood that the systems and methods described herein are not limited to autographing eBooks. The systems and methods can be altered to also work with other media, such as music albums, music tracks, movies, applications, or other consumable digital media stored on a user's electronic device. For example, the systems and methods described below can also allow an actor to autograph a copy of a movie stored on the user's electronic device. As another example, another implementation can allow an artist to autograph a photo or image created by the artist that is stored on the user's electronic device. As yet another example, the systems and methods described below can also allow a singer to autograph a copy of the singer's song or album that is stored on the user's electronic device. For simplicity and brevity, the examples and embodiments described within will relate to an author autographing an eBook for one or more readers however a person skilled in the relevant art would be able to also apply these teachings broadly to a person autographing digital media stored on a device that belongs to another. The detailed description below will describe topics such as the autograph page, methods for creating an autograph, authenticating autographs, and virtual signings, to name a few. A brief introductory description of a basic general purpose system or computing device which can be employed to practice the concepts is illustrated in FIG. 1. A detailed description of autographing techniques will follow. Several variations shall be discussed herein as the various embodiments are set forth. The disclosure now turns to FIG. 1.

General System

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, a solid state drive, a tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now turns to techniques and systems for embedding autographs in an eBook or other media.

The Autograph Page

Figure 2:
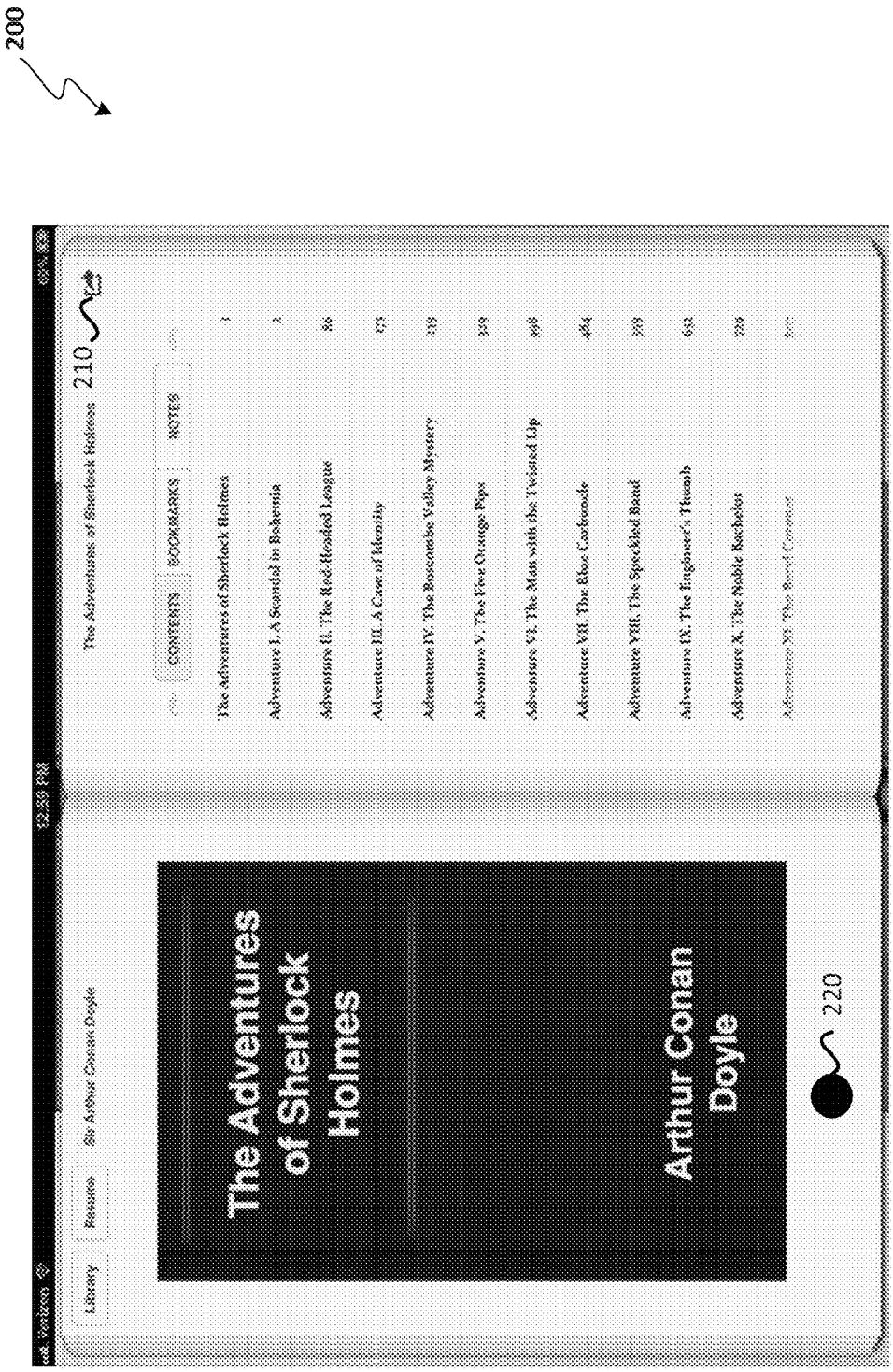
FIG. 2 illustrates an exemplary eBook presented to a user by a reader application running on an electronic device.

FIG. 2 illustrates an exemplary eBook presented to a user by a reader application running on an electronic device. The electronic device can be portable and can include components typically found in a computing device such as a processor 120, a memory containing computer readable instructions 160, and, output device 170, such as display 200. The memory 160 can also store a reader application. eBooks or other digital media can be stored in the memory 160 and presented to the user via display 200. Here, display 200 is in a landscape orientation. In some examples, the display 200 can be used in conjunction with other input/output devices to present digital media to the user. An exemplary reader application is Apple Inc.'s iBooks™ application and an exemplary electronic device is Apple Inc.'s iPhone™ or iPad™.

Some eBooks, when delivered from the publisher, can include an autograph page embedded within the eBook. For example, the autograph page can be, the title page, the first page after the title page, the last page of the eBook, etc. In another example, the autograph page may be a hot spot autograph widget area in a page of the eBook that is configured to receive autographs. The hot spot widget area can be on the cover of the eBook, the table of contents, title page, or other location in the eBook. Both the autograph page and the hot spot widget area can include autograph fields for storing a signature, text, audio clips, images, photo albums, videos, or other media items that can be received by a user through senses such as sight, sound, touch, and taste.

Other eBooks when delivered from the publisher may not be configured to receive autographs. FIG. 2 illustrates an example of these other eBooks. In this example, display 200 presents an eBook titled "The Adventures of Sherlock Holmes" that does not have an autograph page or autograph widget. For eBooks that do not have a place for the author to sign, readers or authors can generate an autograph page for the eBook by utilizing an application running on the electronic device. The ability to generate an autograph page can be readily available to the reader and author or can be a controlled process to ensure that only authorized persons are able to autograph the eBook. Alternatively, the autograph page can be automatically generated when needed as will be discussed below.

FIG. 2 illustrates two examples of how an autograph can be created in an eBook. An autograph or autograph page can be created by a device owned or controlled by a person with autograph page creation rights. This can be the author, or others. A person with autograph page creation rights (such as the author) can also temporarily grant these rights to another device.

Once the party has rights to generate the autograph creation page, there are multiple ways to do so. In one example, an autograph page can be created by selecting menu 210. Menu 210 can be a pull down menu that includes a user selectable option for creating an autograph page. The autograph page can be configurable through menu 210. For example, the autograph page can be placed in front of the current page, behind the current page, at a user specified page, on the cover of the book, or any other location on the eBook. The autograph page can also be configured to specify the fields that will make up the autograph (e.g., signature, text box, audio clip, image, photo album, video, other media content). Menu 210 can also include options to toggle on and off the presentation of the autograph.

In another example, an autograph page can be created though touch gestures. For example, a user can touch and hold spot 220 on display 200 to initiate an autograph page generation sequence. In one embodiment, the generation sequence can place an autograph page before the current page. By touching and holding a spot on the eBook, a pop up menu can be presented to the user. The pop up menu can be similar to the pull down menu described above and can be used to configure the autograph page. In another embodiment, spot 220 can specify the location that the autograph will appear in the eBook. Thus, an author or reader can flip through the eBook to a desired spot to place the autograph and proceed to press and hold the desired spot. Pressing and holding the desired spot can result in a pop up menu for configuring the type of autograph that will be created. In yet other examples, the autograph page can be generated through a combination of the examples described.

Figure 3:
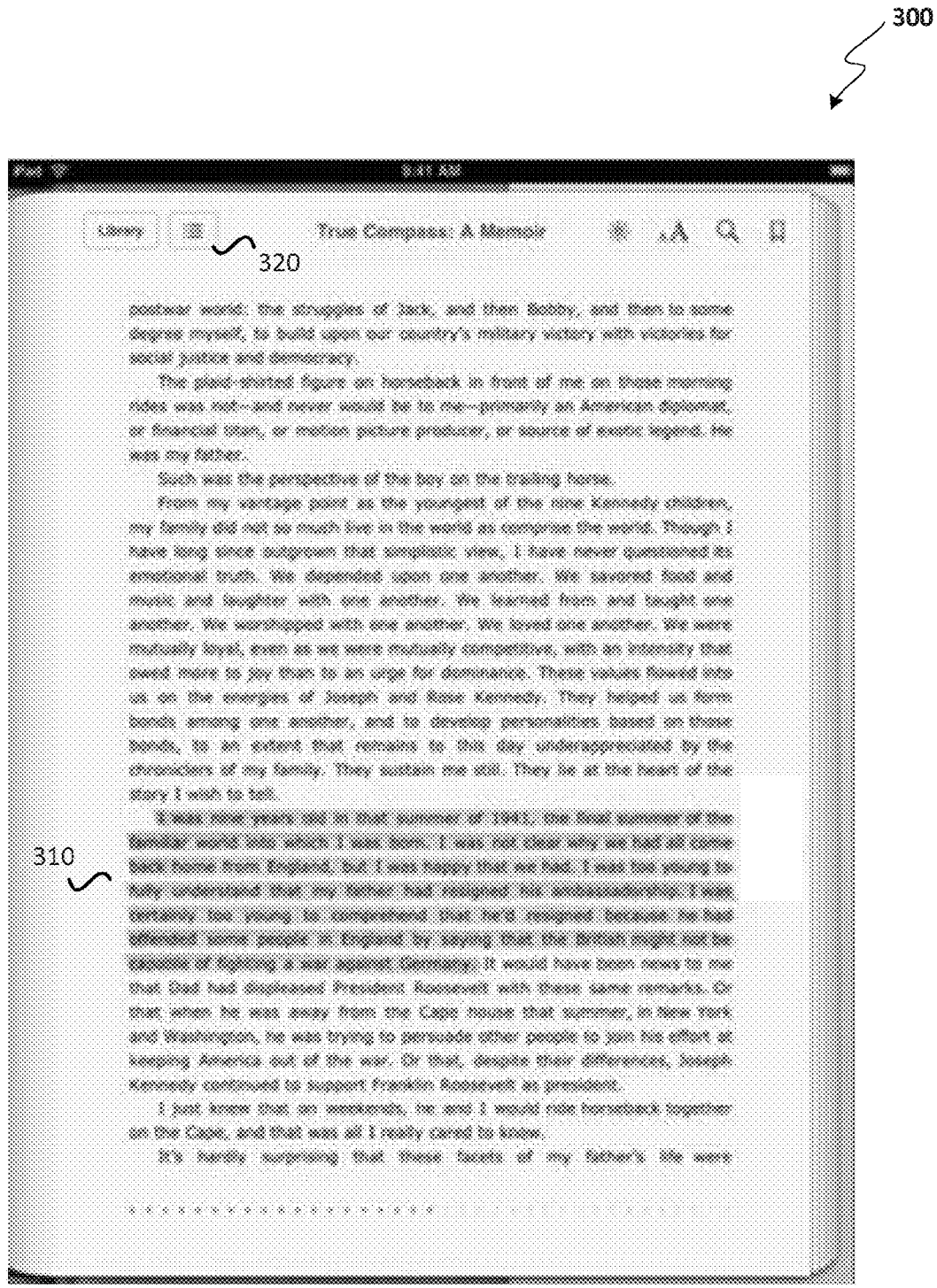
FIG. 3 illustrates another exemplary eBook presented to a user by a reader application running on an electronic device.

FIG. 3 illustrates another exemplary eBook presented to a user by a reader application running on an electronic device. Here, display 300 is in a portrait orientation. Display 300 can switch between portrait orientation and landscape orientation based on reader preference or the orientation of the electronic device. As shown here, a block of text from the eBook presented on display 300 has been selected by highlight 310. Text highlighted by highlight 310 can be used as part of an autograph, or alternatively, as text that the autograph should be associated with or placed next to.

As an example, a user can highlight text in the eBook through a contextual touch gesture (such as placing a finger down at the beginning of the text and swiping to the end of the portion of text). A user can select highlight 310 by pressing and holding onto the highlight. This can result in a pop up menu as discussed above in FIG. 2 with user selectable options to customize the autograph. The user selectable options can include incorporating the highlighted text as part of the autograph (e.g., an autograph that includes a passage from the book with the signature and personalized note from the author) or associating an autograph with the highlighted text. Alternatively, the autograph can be created and customized through menu 320. For example, a user can select menu 320 after selecting a passage or highlighted text in the eBook. A plurality of user selectable options can be presented to the user, including one or more options for creating an autograph. The options can include creating an autograph that incorporates the selected passage or highlighted text and/or selecting where the autograph will be placed. The location of the autograph can include placing the autograph on a particular location in the eBook, associating the autograph with text in the book (especially for reader applications or eBooks with flowing text), or associating an autograph with the selected passage or highlighted text. In yet other examples, the autograph page can be generated through a combination of the examples described.

In one embodiment, the creation of the autograph hot spot or autograph page can be controlled by a person with special permissions. Examples of persons with special permissions can be the author of the eBook or the owner of this copy of the eBook. By controlling the creation of an autograph page, the autograph would be thought of by readers as something that is more desirable or sought after, particularly if the autograph page can only be created by the author or at an author's book signing. Controlling the creation of the autograph page or hot spot would also prevent the page from being used for other purposes. For example, it would prevent readers from creating an autograph page between friends and having friends sign the eBook similar to a high school yearbook. It would also prevent a person that borrows another's electronic device or eBook from creating an autograph page.

Figure 4:
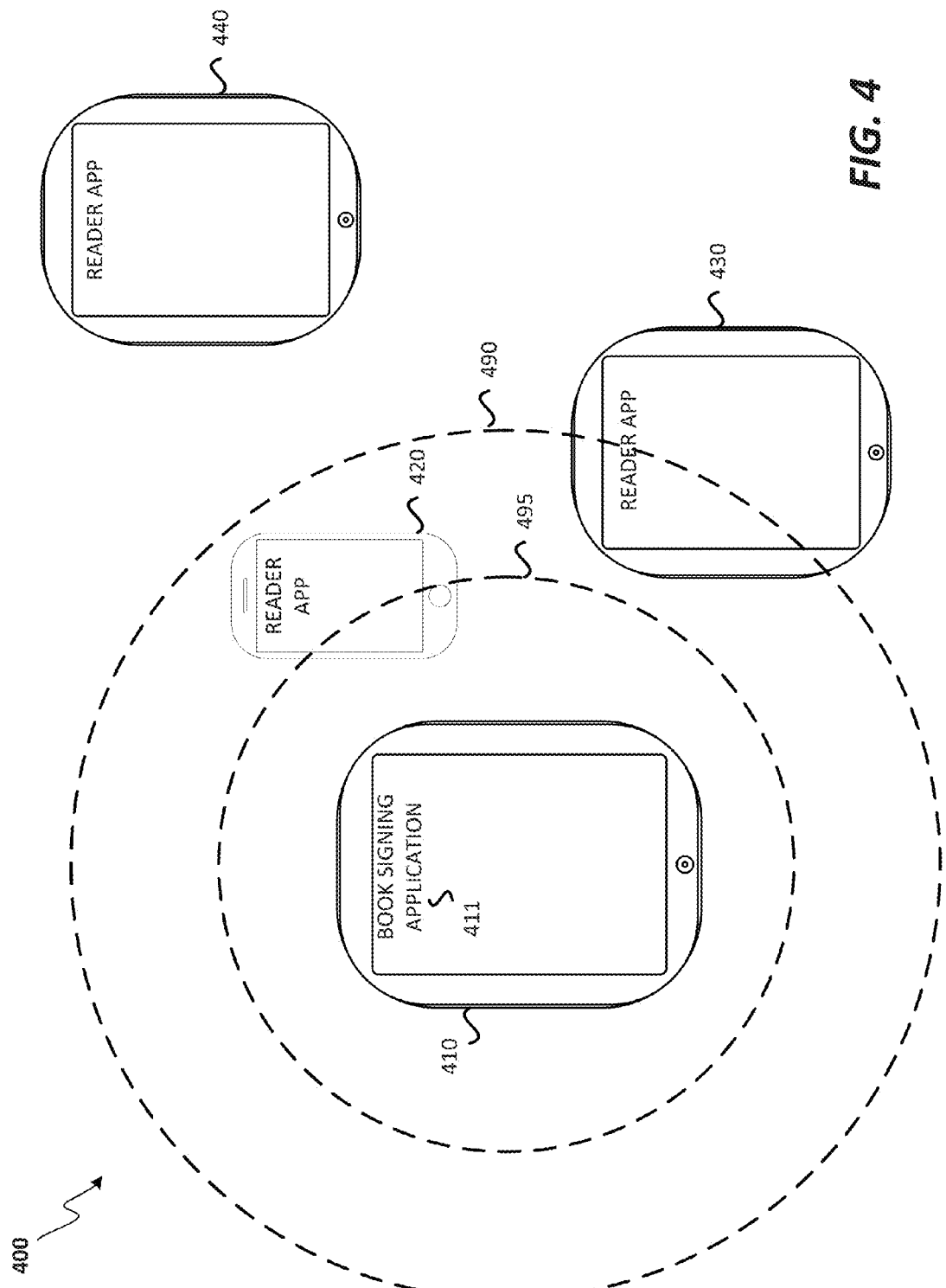
FIG. 4 illustrates an example of an autograph page creation system.

FIG. 4 illustrates an example of an autograph page creation system. Autograph page creation system 400 is author-centric in that the author has special permissions to create an autograph page. In some examples, the author of the eBook is the only one with the rights to create an autograph page. While the author controls who can and cannot generate the autograph page, the author does not have to be the party that generates the autograph page. Another party can go through the process to generate the autograph page so long as the author grants the party permission to do so. For example, the reader can generate the autograph page so long as the author has given the reader's device the rights or permissions to do so. Once rights or permissions have been given, the reader can customize the look and feel of the autograph page. In essence, the reader can prepare the autograph page for the author to sign, which can include where to on the page to place a photo with the author, where the author signs on the page, and where the author leaves a note on the page. This can prove to be useful at a book signing where the author grants rights or permissions to the reader's device to generate the autograph page and the readers themselves customize the autograph page to their liking, thus opening up the possibility of each reader having a unique format to their autograph page. Controlling creation of the autograph page can prevent autograph pages from being used for an alternate purpose (e.g., a page where friends sign) and also prevent the generation of non-authentic autographs.

Permissions or rights can be granted to a reader's device from an author's device by transmitting a special key capable of unlocking additional functionality in the author's eBook. The special key can a digital password or passcode associated with the author's user account. During publishing, an eBook can contain locked functionality of special features that can, at a later time, be unlocked by the author with the use of the author's special key. For example, an author can transmit the special key to the reader's device to unlock features on the copy of the eBook such as the ability to customize and generate an autograph page.

Examples of processes that the reader can use to generate an autograph page are described in FIGS. 2 and 3. In some examples, granting permission to create an autograph page can include making available to the user special options in the reader application or the eBook that are unavailable during normal use. This can include displaying new options to the user that are normally unavailable or making options that are normally visible but un-selectable into selectable options.

System 400 includes author's device 410, reader's device 420, reader's device 430, and reader's device 440. The notion of an author's device and a reader's device can depend upon the user account that is associated with a particular electronic device. For example, both the author and the reader can be using the same type of electronic device, such as an iPad™. However, an author's device can be associated with an author's user account. Thus, the author's device can include special metadata, unique identifiers, special keys, or applications that are only available to an author of an eBook. Similarly, a reader's device can be associated with a reader's user account and as a result, contain special metadata, unique identifiers, special keys, or applications that are only available to a reader or are unique to this particular reader. Author's device 410 is running book signing application 411. Book signing application 411 can be an application downloadable through an online store. The book signing application, which is an autograph tool, can be available only to registered authors of products sold through the online store. The book signing application can be a standalone application or alternatively be part of an authoring application for creating eBooks. For example Apple's iBooks Author™ can include the functionality of the book signing application.

Book signing application 411 is configured to perform various tasks important to autographing an eBook. These tasks include, but are not limited to, generating an autograph page or autograph hot spot, granting rights to create an autograph page or autograph hot spot, creating an autograph, and authenticating an autograph. In one embodiment, book signing application 411 is configured to interact with other hardware or software of the author's device. For example, book signing application 411 can control the wireless network antenna, cellular antenna, and Bluetooth of the author's device 410 to communicate with an electronic device for performing one or more of the autographing tasks.

In this example, book signing application 411 is configured to communicate with one or more electronic devices within a coverage area of the author's device. The coverage area defines an area in which the author's device is capable of communicating with electronic devices for the purpose of granting rights for generating autograph pages or for creating autographs. As shown, all electronic devices within system 400 are portable. In other examples, one of the devices, such as the author's device, can be fixed to a location. Examples of communication mediums include cellular network, wireless network, wireless signal, Bluetooth, or other communication channels. Here, author's device 410 is capable of communicating with electronic devices within coverage area 490. Coverage area 490 can be a radius of a distance around author's device 410. Therefore as the author's device moves, so does the coverage area. The distance can be manually set by the user, automatically set by author's device, predefined by the author, predefined by hardware constraints of the author's device or reader's devices, dynamically updated based on signal strength, and others. For example, author's device 410 can transmit a Bluetooth signal to communicate with nearby devices. A Bluetooth signal exchanges data with other devices over short distances using short-wavelength radio transmissions. With the author's device as the source of the signal, a radius around the author's device defines the coverage area in which the author can communicate with other devices. As another example, the communication channel can be a very short-wavelength signal where devices are able to communicate with one another when the devices come in contact. This is known as "tapping" or "bumping" another device. A signal such as a Bluetooth signal can be set to communicate through "tapping" by limiting the coverage area. As yet another example, the communication channel can also be wired communication, for example by connecting the author's device to the reader's device via a cable. An exemplary cable can be a 30-pin connector, USB, etc. In other examples, coverage area 490 may not be dependent on the location of the author's device 410. For example, coverage area 490 may be based on the author's device communicating with other devices through a wireless network. In this scenario, the strength and the location of the source of the wireless signal would determine the boundaries of the coverage area. The author's device sends data to the wireless network, which in turn delivers those signals to the intended recipients. Both the author's device and the reader's devices would be clients to the wireless network in this scenario.

In this example, book signing application 411 queries for devices that are within coverage area 490. Reader's device 440 is located outside coverage area 490 and thus is unable to communicate with author's device 410. In contrast, reader's device 420 and reader's device 430 are within coverage area 490 and thus are able to communicate with author's device 410. After locating the devices that are within the coverage area, the author's device 410 can check if any of the devices within the coverage area store a copy of an eBook which the author is autographing. This process can include querying the devices to determine whether each device within the coverage area stores a copy of the author's eBook. Alternatively, the author's device can request a list of all eBooks from each device and then make the determination. Once it has been determined that a device stores a copy of the author's eBook, the book signing application 411 can perform one or more autographing tasks. The autographing tasks that are performed can be automatically performed by the book signing application 411 when devices within the coverage area include a copy of the author's book, or can be manually performed by the author. For example, the author can customize the book signing application 411 to automatically grant rights that allow the device to generate an autograph page in the eBook. As another example, the book signing application 411 can automatically generate and send an autograph page to a reader's device when the eBook is missing an autograph page. As yet another example, the book signing application 411 can automatically transmit an autograph page template to the device and populate certain fields in the template with generic elements such as the author's signature. This can save the author time by having generic autograph fields automatically filled.

In some embodiments, the coverage area can be divided into multiple coverage zones, where different tasks are performed by the author's device or the reader's device depending on the coverage zone that the author's device or the reader's device is in. In other words, different coverage zones can be mapped to different tasks such that the task performed is based on the coverage zone that the reader's device is in. The coverage zones can be overlapping such as shown in system 400 where coverage zone 495 resides in the middle of coverage zone 490.

In one scenario, a reader is waiting in line at a book signing event. While waiting in line, the reader's device is within (or enters) a first coverage zone (e.g., coverage zone 490). In response to the reader's device being within this coverage zone, the author's device can automatically transmit instructions to generate an autograph page in the copy of the eBook stored in the reader's device if an autograph page is missing. When the reader is in the front of the line and the reader's device is next to the author or the author's device, the reader's device is within a second coverage zone (e.g. coverage zone 495). In response to the reader's device being within this coverage zone 495, the author's device can automatically transmit instructions to populate specific fields in the autograph page with predefined values. For example, fields for the author's signature or the author's photo can be automatically filled in with predefined values. The predefined values can be user defined or default values. In some examples, the book signing application can randomly select a value from a number of predefined values for each field, thus preserving the appearance of personalization. This can speed up the book signing process by allowing the author to spend time on fields that personalize the autograph to the reader (such as a photo with the reader or a personalized note to the reader) and less time on the generic fields of the autograph.

In yet other examples, actions can be automatically performed by the author's device or the reader's device when the device transitions from one coverage zone to another coverage zone. This can also be known as entering or exiting a coverage zone. For example, an author's device 410 can automatically check whether reader's device 420 contains a copy of the eBook that the author is signing when reader's device 420 enters coverage zone 490. Querying for a copy of the eBook can include checking a user account associated with reader's device 420 to determine whether a copy of the eBook can be downloaded and stored on reader's device 420. If a copy exists (or is associated with a user account of the reader's device 420), author's device 410 grants reader's device 420 the rights to generate an autograph page at the location the reader desires and customize that autograph page. Once reader's device 420 transitions from coverage zone 490 to coverage zone 495, another action takes place. This action can be the author's device granting reader's device 420 the right to receive inputs into the autograph page. The reader application on the reader's device 420 can also automatically flip to the place in the eBook which the author is to place the autograph. The author autographs the reader's copy of the eBook by taking a photo with the reader and writing a personalized note into the reader's copy of the eBook. This autograph is saved. In other examples, autographing can be recording audio or video. As the reader leaves happily with his autograph, the reader's device 420 exits coverage zone 495 and transitions into coverage zone 490. At this point, the right to receive inputs into the autograph is removed from the reader's device 420, thus preventing the reader or others from editing the autograph. An authentication certificate used to authenticate the autograph can also be received by the reader's device from the author's device or an online store. As the reader leaves the book signing, the reader's device also leaves coverage zone 490. At this point, the rights to generate an autograph page are removed from the reader's device. This is an example of how an autograph can be securely applied to an eBook.

In some examples, the hardware used to sense the coverage zone can be different. For example, a Wi-Fi signal or network can be used to create a large coverage zone while a Bluetooth signal can be used to create a small coverage zone. The author's device can manage multiple signals to keep track of which users are in which areas. In other examples, the same hardware can be used to sense a reader's presence in different coverage zones. The hardware determines the location of the reader's device (either with respect to the author's device or geolocation) and then calculates whether the reader's device is in a particular coverage zone.

Creating an Autograph

Figure 5:
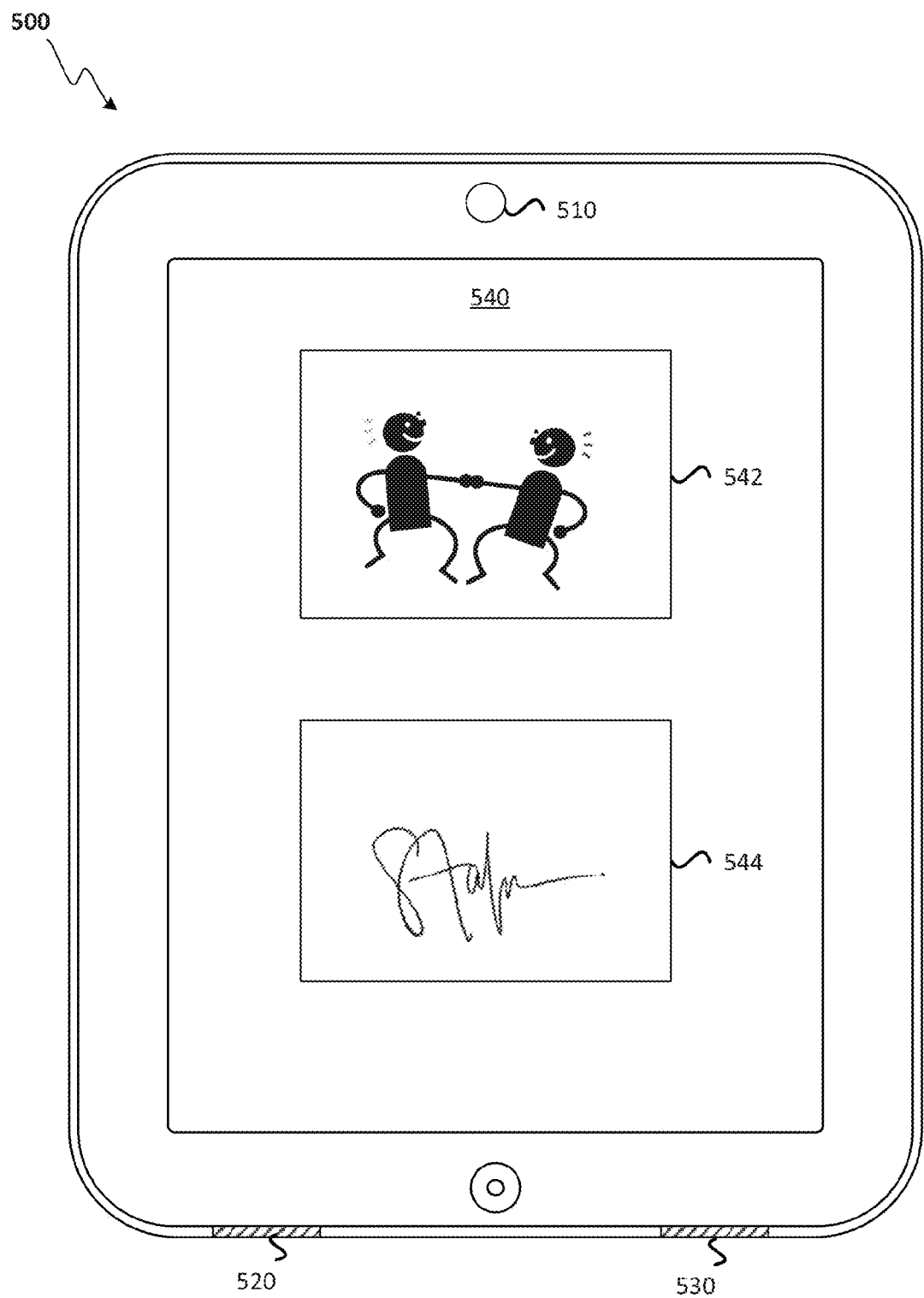
FIG. 5 illustrates an exemplary device for creating autographs.

FIG. 5 illustrates an exemplary device for creating autographs. The autograph can be generated on the author's device or alternatively on the reader's device. When the autograph is generated on the author's device, the autograph is transmitted to the reader's device after the autograph is completed. During creation of the autograph, feedback can be provided from both the author and the reader. The autograph can be transmitted to the reader's device via a wired or wireless connection between the two devices or alternatively through servers or the cloud. Device 500 (which can be the author's device or reader's device) includes camera 510, speaker 520, microphone 530, and touch screen display 540. Depending on the autograph desired and the fields that make up the autograph, camera 510, microphone 530, or touch screen display 540 can be used to generate the autograph. The generated autograph can be reviewed using speaker 520 or touch screen display 540.

In this example, the autographing takes place on the reader's device. Touch screen display 540 presents two fields that are to be filled in, an image field 542 and an autograph field 544. The image field 542 can be configured to receive its input from camera 510 while the autograph field can be configured to receive its input from touch screen display 540. In one scenario, the reader orients device 500 such that an image can be taken with the author. Once the image has been taken, the image appears in image field 542. At this point in time, the reader can review the image and decide whether he would like to accept the image or retake it. The reader can also hand device 500 to the author for his signature into field 544. The author can directly sign on touch screen display 540, either with his finger, a stylus, or other writing instrument. Similar to the image field 542, the author can clear and resign into field 544 as many times as he wishes or until the author or the reader is satisfied. The author can also add in a personal note to the reader. In the case of audio microphone 530 can be used to record the audio while speaker 520 can playback the audio for review. Alternatively, the audio can be transmitted to device 500 from an author's device or other device. For video, the video portion can be captured by camera 510 while the sound is captured by microphone 530. Playback of the video can be made possible with touch screen display 540 and speaker 520.

Figure 6:
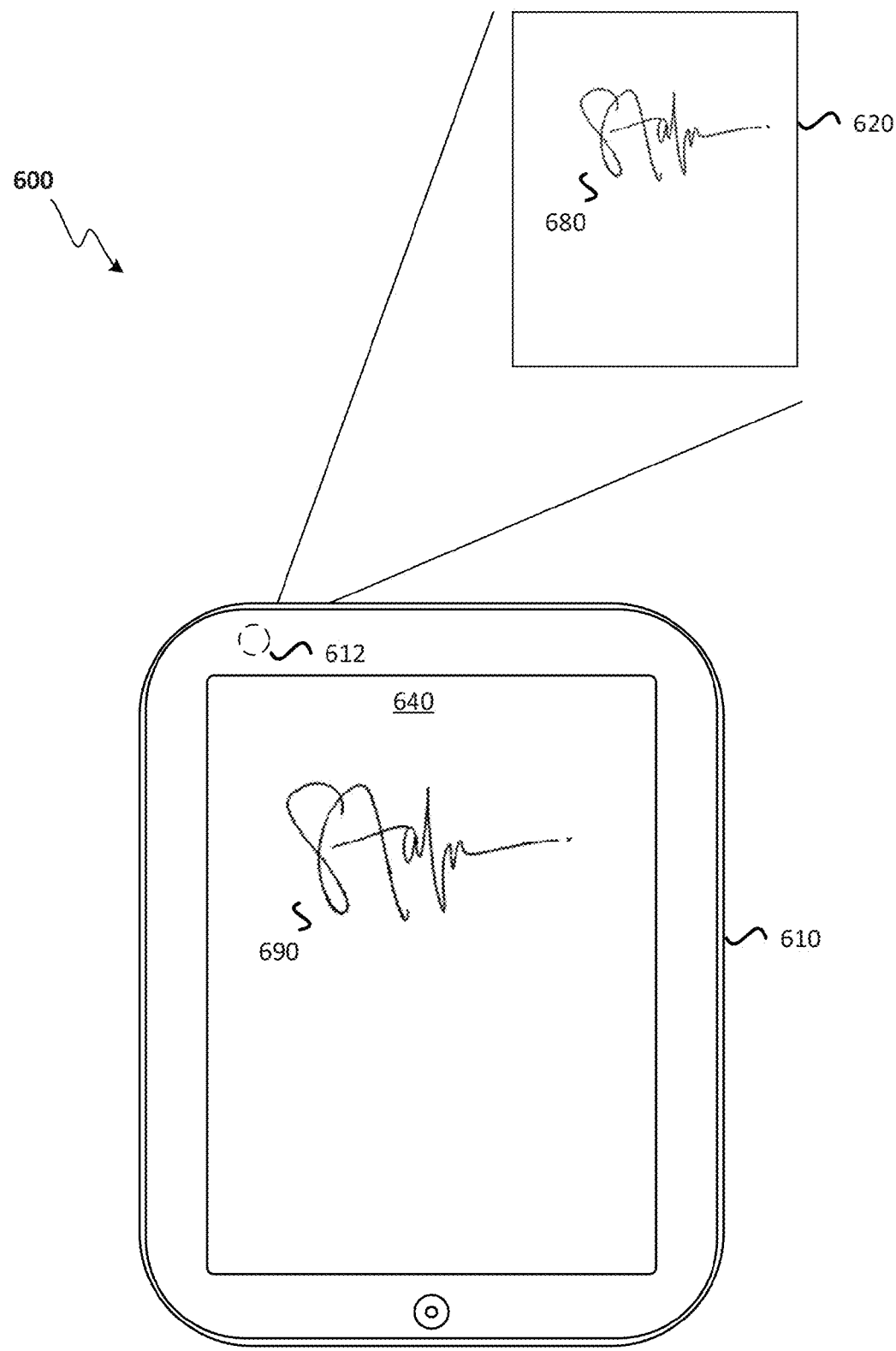
FIG. 6 illustrates an exemplary system utilizing a capture application to create an author's signature.

FIG. 6 illustrates an exemplary system utilizing a capture application to create an author's signature. Some authors may prefer signing or writing a note on paper. In order to accommodate these authors, a capture application can be run on the author's device. The capture application is configured to receive handwritten notes or signatures from a piece of paper and save the handwritten notes or signatures as elements that can be placed into fields of an autograph. Here, system 600 includes author's device 610 and paper 620. The author has signed signature 680 onto paper 620. After signing paper 620, the author can utilize a capture application on author's device 610 to capture an image of autograph 680. The capture application can communicate with an image capturing device such as camera 612 on author's device 610. The author can orient camera 612 so that signature 680 can be captured entirely in the image. After capture, the image is displayed on display 640 for the author to preview. As shown here, the image includes digital signature 690, which is a digital rendition of signature 680 on paper 620. Once the author is satisfied with digital signature 690, the digital signature can be saved on author's device 610. Saving the digital signature can include automatically resizing the signature or automatically cropping the image so that only the digital signature remains. The digital signature can be set as a default value that is to be automatically populated into a signature field of the author's autograph that is to be downloaded to reader's devices during a signing event. In other examples, the capture application can be expanded to capture a note from the author or a video of the author speaking. The autograph data can be captured, reviewed, and saved for subsequent attachment to autographs.

Authenticating an Autograph

The authenticity of an autograph can prove to be important to the author as a means for protecting his reputation. For example, fake autographs appearing to be from the author that include derogatory comments and/or images can hurt in the reputation of the author. The author may also be interested in controlling the quality (and quantity) of the autographs that are circulated within the public and as such, autographs need to be authenticated. Besides the author, authenticity can also prove to be important to the reader. The reader may be interested in being able to validate to others that he did in fact meet the author. This can be particularly important if the reader were to try to sell his copy of the eBook to another person as an eBook that has been autographed by the author. Some of the methods already discussed above can help maintain the authenticity of an autograph. For example, controlling the creation of autograph pages/hot spots, controlling the creation of autographs, and including a photo (or video) with the author as part of the autograph are all ways of confirming that the author was the one that created the autograph. In some examples, the autograph can be further authenticated through the use of authentication certificates. Authentication certificates act as a proof of authenticity in that they are configured to authenticate an autograph in an eBook.

Figure 7:
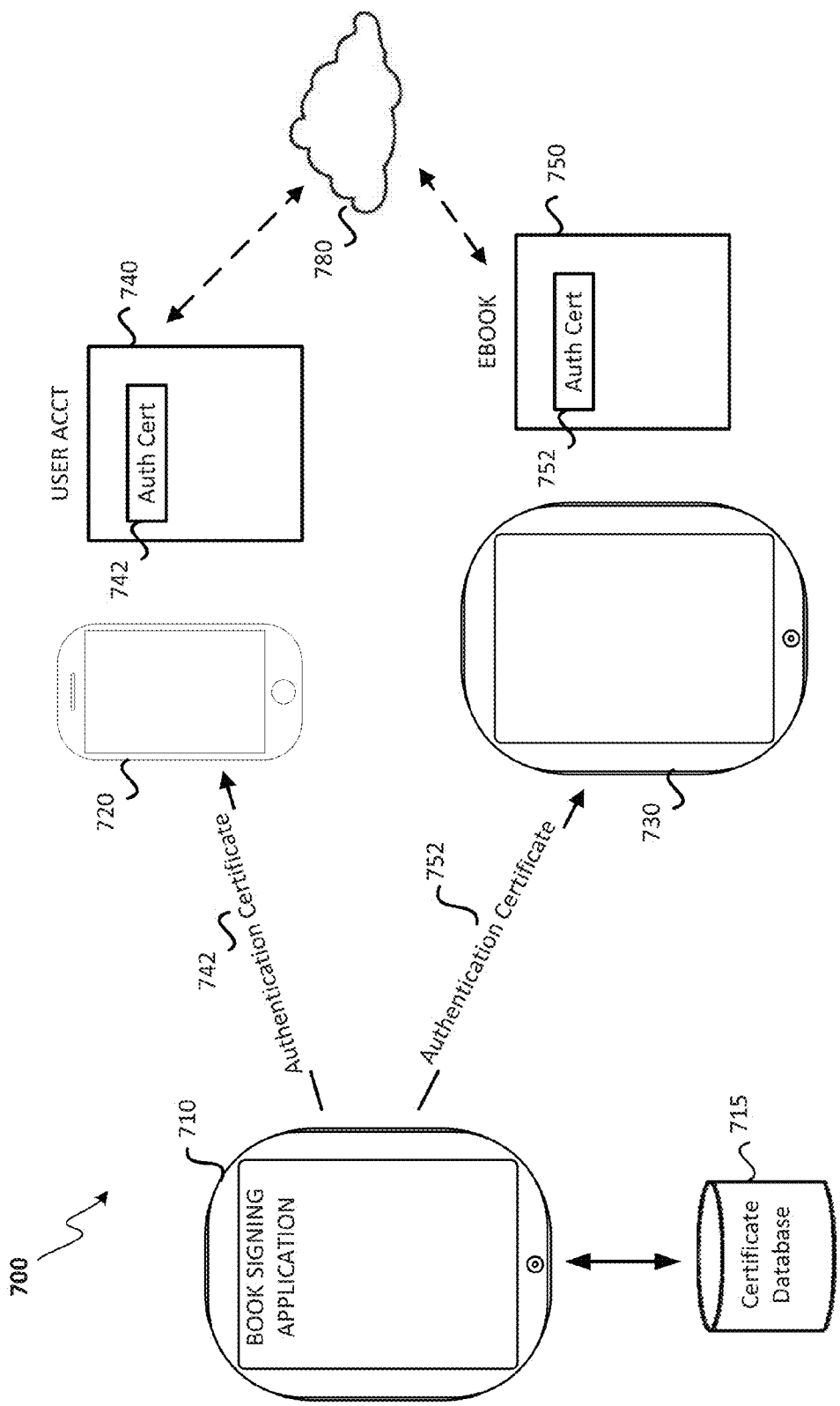
FIG. 7 illustrates an exemplary autograph authentication system.

FIG. 7 illustrates an exemplary autograph authentication system. System 700 includes author's device 710, authentication certificate database 715, reader's device 720, and reader's device 730. In this example, autographs have already been generated and are stored on the readers' devices. The authentication certificates can be stored on the author's device, on a remote server, or on the cloud. System 700 illustrates how authentication certificates are generated and several methods for associating an authentication certificate with an eBook.

Before an authentication certificate can be associated with an eBook, the authentication certificate must first be generated. In one embodiment, certificate database 715 can include a certificate generator that is configured to create authentication certificates. Created authentication certificates can be sent directly to the reader's devices, or alternatively be sent to the author's device for distribution to reader's devices. Certificate database 715 can maintain an up-to-date database of valid authentication certificates. The database can be used during verification. In another embodiment, the authentication certificate can be generated by the author's device. For example, a book signing application running on author's device 710 can be configured to also generate authentication certificates. The authentication certificate is subsequently passed to certificate database 715 which maintains an up-to-date database of authentication certificates. If it is desirable for the author's device to generate unique authentication certificates, the author's device can use unique metadata from the reader's device to generate the authentication certificate. The unique metadata can be a MAC address, unique hardware identifier, unique identifier tied to a user account, or other value that is unique to the reader or the reader's device. Depending on the implementation details, the authentication certificates can be associated with the user account or the eBook. There are advantages to each which are described below.

In one embodiment, the authentication certificate can be associated with the user account. For example, author's device 710 can transmit authentication certificate 742 to reader's device 720. Reader's device 720 in turn associates authentication certificate 742 with user account 740. By maintaining authentication certificates on the user account, the authentication certificate would follow the user, regardless of the device the user is currently using or even if the copy of the eBook is gifted or sold to another user. In other words, the autograph and its authentication certificate are tied to the reader that originally received the autograph. This implementation can store the authentication certificates along with other metadata that is associated with the user account.

In another embodiment, the authentication certificate can be associated with the eBook. Associating the authentication certificate with the eBook results in the autograph remaining with the eBook permanently. Therefore, autographing an eBook would have similar properties as autographing a tangible book—autographs permanently travel with that particular copy of the book. This implementation is most similar to a traditional autograph. The authentication certificate can be tied to the eBook by associating the certificate with a unique identifier of the eBook or other means. As shown here, author's device 710 can send authentication certificate 752 to reader's device 730. Reader's device 730 in turn associates authentication certificate 752 with the copy of the eBook 750. Authentication certificate 752 and the autograph can be tied with eBook 750 as part of eBook 750's metadata.

Authentication certificates that form part of the user account or the eBook can be synced with a remote server or a cloud 780. The remote server or cloud 780 can include storage for maintaining a list of eBooks owned by the user along with autographs, notes or other personalization metadata associated with the eBooks. This can allow a user's eBooks to be downloaded to other devices of the user with all the personalization intact.

In some examples, the autographs can be verified for authenticity when the eBook is synced with the remote server, or online store. Both of these can be represented by cloud 780 in FIG. 7. The verification can include verifying the authentication certificate associated with the autograph against certificate database 715. If the authentication certificate is found in certificate database 715, then the autograph is authentic and can be synced with the remote server. On the other hand if the authentication certificate is not found in certificate database 715, the autograph can be deemed fraudulent. Syncing of fraudulent autographs to the online store can be blocked. Fraudulent autographs and their associated authentication certificates can also be deleted from the reader's device. In some examples, a notification can be sent to one or more parties including the author that a fraudulent autograph has attempted to be synced with the remote server. The notification can include relevant data such as the user account attempting to sync a fraudulent autograph, the eBook associated with the fraudulent autograph, and the authentication certificate of the fraudulent autograph. This can be one failsafe to remove unauthenticated autographs from system 700.

In some examples, the authentication certificate can include metadata configured to identify the autograph and the owner of the autograph (whether it be an eBook or a user account). The metadata can be encrypted. During verification, the metadata can be decrypted and evaluated to determine whether any changes have been made to the autograph or the owner of the autograph before synchronization. In some examples, a simple checksum or hash can be used instead or in combination with the metadata to confirm that the autograph and/or the identity of the autograph's owner has not been tampered with prior to syncing.

Figure 8:
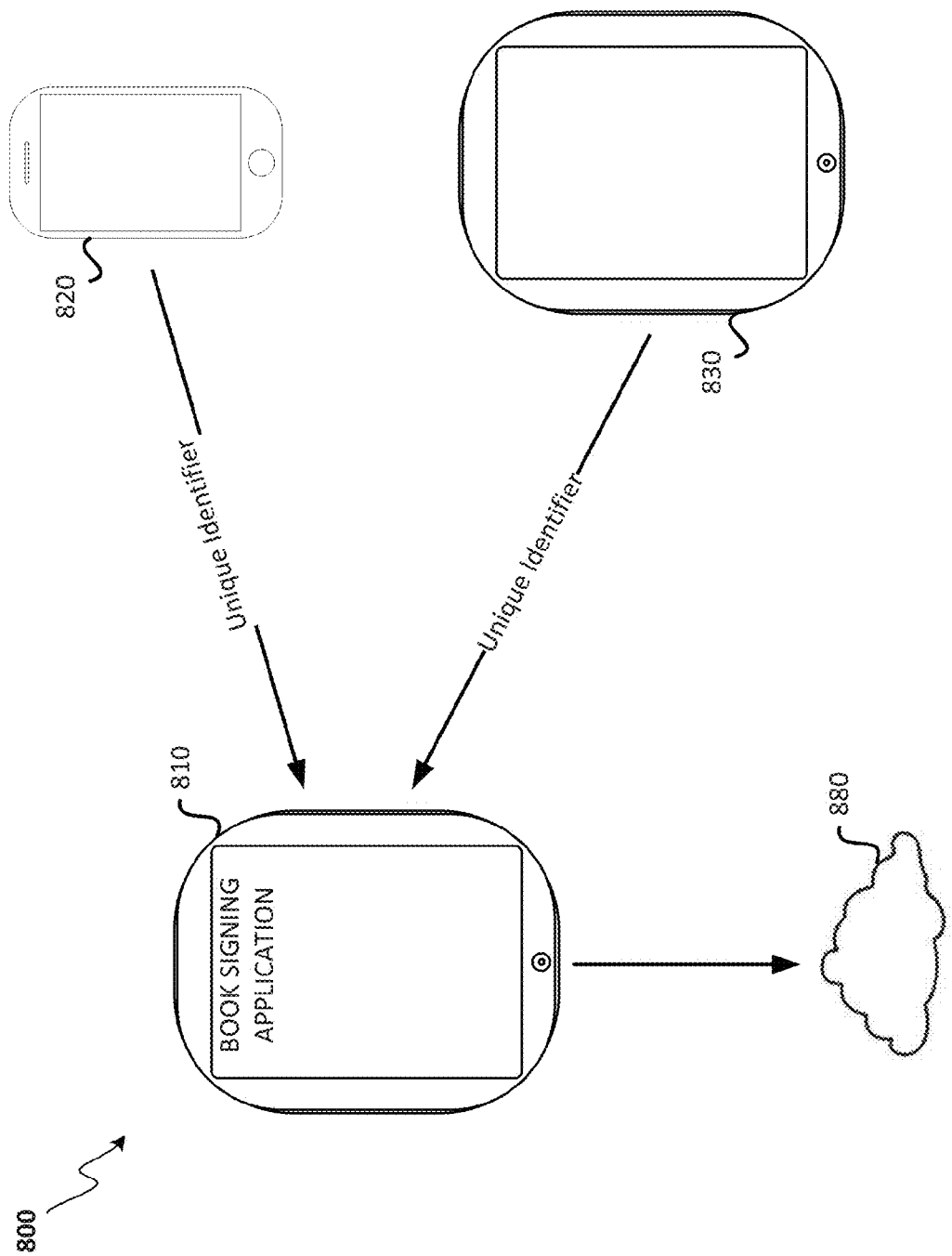
FIG. 8 illustrates another exemplary autograph authentication system.

FIG. 8 illustrates another exemplary autograph authentication system. Unlike system 700 of FIG. 7, system 800 is configured to authenticate autographs without transmitting authentication certificates to the reader's devices or maintaining authentication certificates on the reader's devices. Instead, unique identifiers received from the reader's devices are used to verify that an autograph associated with the reader's device is authentic and has not been tampered with. System 800 includes author's device 810, reader's device 820, reader's device 830, and online store 880. After generating the autograph and transmitting the autograph to reader's device 820, reader's device 820 can transmit a unique identifier to author's device 810. The unique identifier is configured to uniquely identify the autograph and tie the autograph to a specific eBook or user account (depending on implementation). The use of a hash, checksum, or an encryption/verification scheme can be used to ensure that the autograph and its owner (either the eBook or the user account) has not changed before the autograph is verified and synced on the remote server.

The author's device 810 receives unique identifiers from reader's device 820 and reader's device 830. The unique identifiers are then stored in online store 880. When reader's device 820 and 830 attempt to sync their autographed eBooks with online store 880, the online store 880 determines that the eBooks include a new autograph. As a result, the online store 880 can run a verification routine to verify that the autographs originated from the author and/or have not been altered by the reader. In one example, verification can include performing a hash based on the autograph and a unique ID of the owner and comparing that hashed value with a similarly generated value stored on the online store 880 when the autograph was originally created. If the autograph and the owner have not changed, the hashed values will be the same. In some examples, verification of autographs can periodically take place at a predetermined schedule or predetermined event. Examples of a predetermined event include every time a reader opens an eBook or every time the user syncs with his online account. In other examples, the verification does not have to take place on an online store. For example, the author's device can maintain a database of unique identifiers and the readers can contact the author directly to verify whether an autograph is authentic. If verification is unsuccessful, several remedial actions can take place. For example, a notification can be sent to the author or the online store. As another example, the autograph in question can be removed from the eBook and the online store.

Virtual Signings

Figure 9:
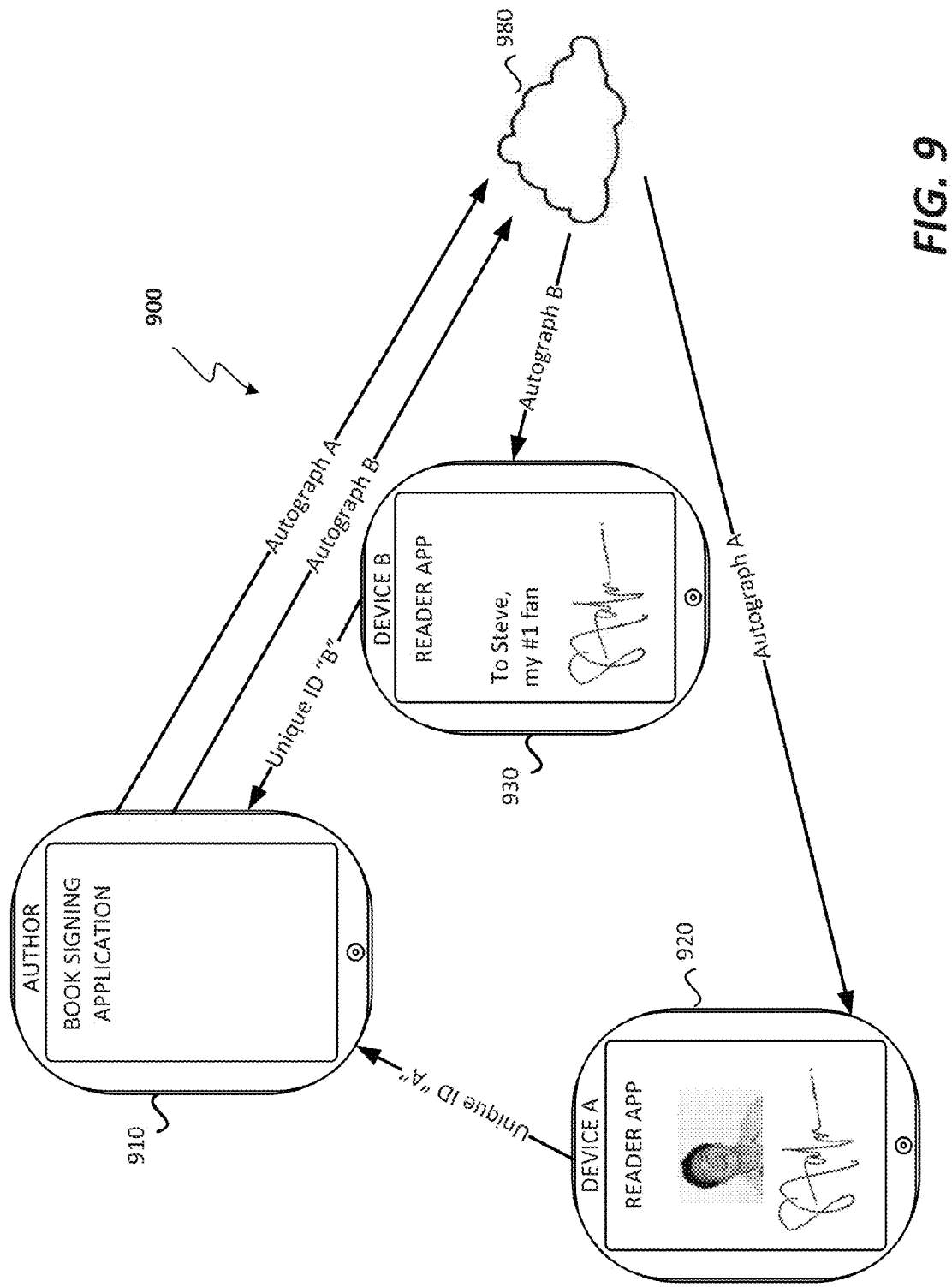
FIG. 9 illustrates an exemplary autograph generation system.

FIG. 9 illustrates an exemplary autograph generation system. System 900 is unlike system 700 and 800 in that autographs do not have to be in person. This can allow the author to reach a broader audience versus in person signing events. Here, the authentication can take place online, for example in a virtual chat room or through instant messaging. System 900 illustrates an example of a virtual chat room with three parties, author 910, reader 920, and reader 930. The author can participate in the chat room via a book signing application on his device. Similarly, the readers can participate in the chat room via a reader application on their devices.

As readers enter the chat room, a user account identifier associated with the reader is provided to the author. The author can use the identifier to distinguish the reader from other readers in the chat room. If the identifier is unique, the author can also use the identifier as a key for encrypting transmissions to the reader. This provides security to ensure that the transmissions are only understood by the intended recipient. In some examples, the transmission can be the autograph or messages to the reader. In other examples, the transmissions can include a video chat session between the reader and the author, wherein a portion of the video chat session can be incorporated as an element in a field of the autograph. Depending on implementation details, the video chat session can also serve as the identifier.

The author and the reader can communicate back and forth, while using the reader's unique identifier as an encryption key, to sort through the details of the autograph. Once the autograph is complete and satisfactory to both parties, the autograph can be transmitted by the author to online store 980. Online store 980 associates the autograph with the user account or the eBook and then subsequently pushes the autograph to the reader's device. Thus, the reader in this example is a passive party to the autograph creation process and thus does not have the ability to edit or alter the autograph. This can be another possibility for providing security to the entire autograph process.

As shown here, reader device 920 and 930 transmit a unique identifier to author's device 910. Author's device 910 uses these unique identifiers to identify the user account of the readers and to securely communicate with the readers. Author's device 910 generates autographs for each of the readers and transmits the autographs to online store 980 where they are stored in memory. When online store 980 receives new autographs from author's device 910, the online store 980 prepares to update its database of autographs to reflect recent changes and then pushes or otherwise transmits the autographs to the readers.

Figure 10:
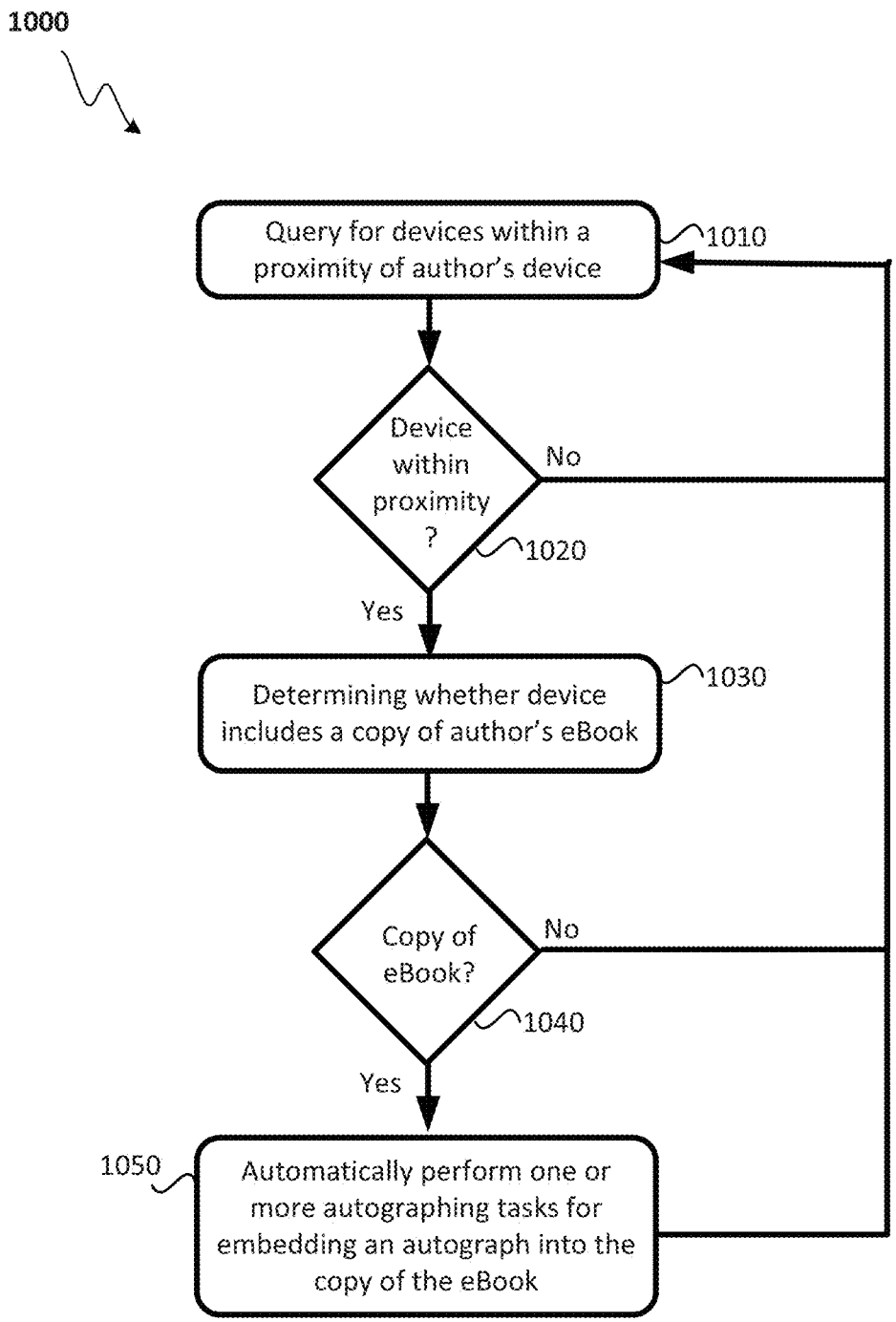
FIG. 10 illustrates an exemplary process for automatically performing one or more autographing tasks based on the proximity of a device to an authoring device.

FIG. 10 illustrates an exemplary process for automatically performing one or more autographing tasks based on the proximity of a device to an authoring device. Process 1000 begins with the author's device querying for devices that are within a proximity of the author's device (1010). The proximity can change depending on the strength of a signal being output by the author's device. As an example, the author's device can broadcast a signal generated by a signing application running on the author's device. Reader's devices who would like to receive an autograph can turn on a signing option in the reader application, thus configuring the reader's device to listen for the signal broadcasted by the author. The author's device will continue broadcasting the signal while it waits for a device to respond to its broadcast signal (1020). Once a reader's device is within proximity of the author's device, the reader's device may respond to the broadcast signal with an ID of the reader's device. This notifies the author's device that another device is nearby. Using the ID of the reader's device, the author's device communicates with the reader's device to determine whether the reader's device includes a copy of the author's eBook (1030). If a determination is made that a copy of the eBook does not exist, this means that this reader's device is not seeking an autograph from this author. The reader is most likely seeking an autograph from a different author nearby, or not seeking an autograph. Thus, the authoring device will continue querying for devices (1010). If a copy of the eBook does exist, the author's device will automatically perform one or more autographing tasks needed to embed an autograph into the copy of the eBook (1050). In one embodiment, the autographing tasks can include a stamp or certificate used to verify that the reader attended an official signing. As an example, an author can use an author's device to broadcast a stamp to all reader's devices that contain a copy of an eBook that is being signed at the official signing. As another example, the author's device can transmit a stamp to a reader's device when the reader carrying the reader's device approach the author's signing table. In yet another example, the stamp can be accompanied with an autograph as described above. All the stamps or certificates that the reader has collected can be presented at a central location on the reader application. Thus, a reader's signature stamp collection would appear similar to collecting stamps in a passport or postage stamps in an album. Once the tasks are completed, the author's device goes back to querying for other devices (1010).

In other examples, process 1000 can be modified such that different autographing tasks are performed based on the distance the device is to the author or the author's device. For example, as the reader (and his device) approaches the author (or author's device), different tasks will be automatically performed.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, solid state drives, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied other types of files to control the secure deletion of those files and other copies of those files from storage.

Those skilled in the art will readily recognize various modifications and changes that may be made to the principles described herein without following the example embodiments and applications illustrated and described herein, and without departing from the spirit and scope of the disclosure.

We claim:

1. A computer implemented method, comprising:
   determining, by an author's device, that a reader's device is within a coverage area in which the reader's device is proximate to the author's device and capable of communicating with the author's device; the author's device being associated with a first user account controlled by an author, wherein the coverage area comprises a first coverage zone and a second coverage zone;
   receiving a communication from the reader's device indicating that a second user account associated with the reader's device is associated with a copy of an electronic book, the electronic book being authored by the author associated with the author's device;
   automatically performing a first autographing task associated with the copy of the electronic book based on the indication;
   determining that the reader's device is within the first coverage zone, and based on the determination performing the first autographing task; and
   learning that the reader's device is within the second coverage zone, and based on having learned that the reader's device is within the second coverage zone, performing a second autographing task that is different from the first autographing task.

2. The method of claim 1, wherein the first user account and the second user account are managed by an online store.

3. The method of claim 1, wherein the first autographing task comprises:
   instructing the reader's device to generate an autograph page when the copy of the electronic book does not contain an autograph page.

4. The method of claim 1, wherein the first autographing task comprises granting the reader's device permissions to customize an autograph page in the copy of the electronic book.

5. The method of claim 1, wherein the first autographing task comprises populating a field in an autograph with a preselected value.

6. The method of claim 1, further comprising:
   sending, to the reader's device, an authentication certificate configured to confirm that contents of a generated autograph and ownership of the generated autograph are not permitted to change; and
   storing a copy of the authentication certificate on an online store.

7. The method of claim 6, further comprising:
   verifying that the autograph is authentic when the reader's device attempts to sync the copy of the electronic book with the online store, wherein verification includes comparing the authentication certificate with the copy of the authentication certificate.

8. The method of claim 6, wherein the authentication certificate is a hash value generated from the contents of the generated autograph and a unique identifier associated with the second user account associated with the reader's device.

9. A non-transitory computer readable storage medium storing instruction which, when executed by a computing device, causes the computing device to perform steps comprising:
   determining that a second computing device has entered a predefined area surrounding the computing device in which the second computing device is proximate to the computing device, the computing device being associated with a first user account and the second computing device being associated with a second user account, wherein the predefined area comprises a first coverage zone and a second coverage zone;
   verifying that the second user account is associated with a copy of an electronic book, the electronic book being authored by the first user account;
   automatically performing a first autographing task associated with the copy of the electronic book based on the verification;
   determining that the second computing device is within the first coverage zone, and based on the determination performing the first autographing task; and
   learning that the second computing device is within the second coverage zone, and based on having learned that the second computing device is within the second coverage zone, performing a second autographing task that is different from the first autographing task.

10. The non-transitory computer readable storage medium of claim 9, wherein the autographing task comprises transmitting an autograph template to the second computing device when the copy of the electronic book does not include the autograph template.

11. The non-transitory computer readable storage medium of claim 9, wherein the autographing task comprises granting a right, to the second computing device, to perform an action associated with generating an autograph.

12. The non-transitory computer readable storage medium of claim 11, wherein the right comprises an ability to select a user selectable option that was previously un-selectable.

13. The non-transitory computer readable storage medium of claim 11, wherein the right is removed when the second computing device exits the predefined area.

14. The non-transitory computer readable storage medium of claim 9, wherein the predefined area comprises of a plurality of coverage areas and an authoring task is selected from a plurality of authoring tasks, wherein each of the plurality of coverage areas is mapped to at least one autographing task from a plurality of autographing tasks.

15. The non-transitory computer readable storage medium of claim 9, further comprising automatically performing another autographing task associated with the copy of electronic book that is different than the autographing task when the second computing device exits the predefined area.

16. The non-transitory computer readable storage medium of claim 15, wherein the another autographing task comprises sending, to the second computing device, an authentication certificate configured to confirm that contents of an autograph generated in part by the first autographing task remains unaltered after generation of the autograph.

17. A system, comprising:
   a first electronic device storing a copy of an electronic book; and
   a second electronic device running a signing application configured to automatically grant, to the first electronic device, a right to perform a first task associated with generating an autograph in the copy of the electronic book when the first electronic device enters a first coverage zone in which the first electronic device is proximate to the second electronic device, and removes the right when the first electronic device exits the first coverage area, and a right to perform a second task associated with generating an autograph in the copy of the electronic book when the first electronic device enters a second coverage zone in which the first electronic device is proximate to the second electronic device, and removes the right when the first electronic device exits the second coverage area, wherein the second task is different from the first task.

18. The system of claim 17, wherein the coverage area is based on a location of the second electronic device.

19. The system of claim 17, wherein the autograph includes a plurality of user selectable fields including a signature, a live image capture, and a live video capture.

* * * * *